US009771047B2

(12) United States Patent
Kruse et al.

(10) Patent No.: US 9,771,047 B2
(45) Date of Patent: Sep. 26, 2017

(54) FRONTAL AIRBAG SYSTEMS FOR OBLIQUE CRASH PROTECTION

(71) Applicant: Autoliv ASP, Inc., Ogden, UT (US)

(72) Inventors: Dion Kruse, Alingsas (SE); Mika Himilainen, Bramhult (SE); Terry Sella, Lake Orion, MI (US)

(73) Assignee: Autoliv ASP, Inc.UT (US)

( * ) Notice: Subject to any disclaimer, the term of this patent is extended or adjusted under 35 U.S.C. 154(b) by 0 days.

(21) Appl. No.: 14/872,913

(22) Filed: Oct. 1, 2015

(65) Prior Publication Data

US 2017/0096118 A1 Apr. 6, 2017

(51) Int. Cl.
*B60R 21/2338* (2011.01)
*B60R 21/203* (2006.01)
*B60R 21/0136* (2006.01)

(52) U.S. Cl.
CPC ...... *B60R 21/2338* (2013.01); *B60R 21/0136* (2013.01); *B60R 21/203* (2013.01); *B60R 2021/23382* (2013.01)

(58) Field of Classification Search
CPC .............. B60R 21/0136; B60R 21/203; B60R 21/2032; B60R 21/2035; B60R 21/2037; B60R 21/2334; B60R 21/2338; B60R 2021/23382; B60R 2021/161
See application file for complete search history.

(56) References Cited

U.S. PATENT DOCUMENTS 5,358,273 A * 10/1994 Onishi .................. B60R 21/233 280/729
5,984,355 A * 11/1999 Meidanis ............... B62D 1/197 280/777
6,254,130 B1 7/2001 Jayaraman et al.
6,315,323 B1 11/2001 Pack, Jr.
6,616,184 B2 * 9/2003 Fischer ................. B60R 21/205 280/735
8,157,291 B2 4/2012 Mayer et al.
9,333,940 B2 * 5/2016 Hicken ................... B60R 21/33
9,393,925 B2 * 7/2016 Miron ................. B60R 21/2338
2004/0012180 A1 1/2004 Hawthorn et al.
2004/0119271 A1 * 6/2004 Webber ................. B60R 21/217 280/731
2005/0212276 A1 * 9/2005 Yamada .............. B60R 21/2338 280/743.2
2006/0131846 A1 6/2006 Abe
2006/0186656 A1 8/2006 Kumagai
2015/0307055 A1 10/2015 Cheng et al.
2017/0015266 A1 * 1/2017 El-Jawahri ........ B60R 21/01512

FOREIGN PATENT DOCUMENTS

EP 1693256 A1 8/2006
GB 2415665 A 1/2006
JP 2007055501 A 3/2007

* cited by examiner

*Primary Examiner* — Barry Gooden, Jr.
(74) *Attorney, Agent, or Firm* — Stoel Rives LLP

(57) ABSTRACT

An inflatable airbag system can be configured to be mounted to a frontal region of a vehicle. The inflatable airbag system includes an airbag and a positioning member, and is configured to deploy in various configurations in response to frontal and oblique collision events and based on an impact angle and a rotational angle of the steering wheel.

20 Claims, 14 Drawing Sheets

FRONTAL AIRBAG SYSTEMS FOR OBLIQUE CRASH PROTECTION

TECHNICAL FIELD

The present disclosure relates generally to the field of automotive protective systems. More specifically, the present disclosure relates to frontal airbag systems that are configured to deploy from a steering wheel in various configurations in response to frontal and oblique collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered to be limiting of the disclosure's scope, the embodiments will be described and explained with specificity and detail in reference to the accompanying drawings.

DETAILED DESCRIPTION

Figure 1:
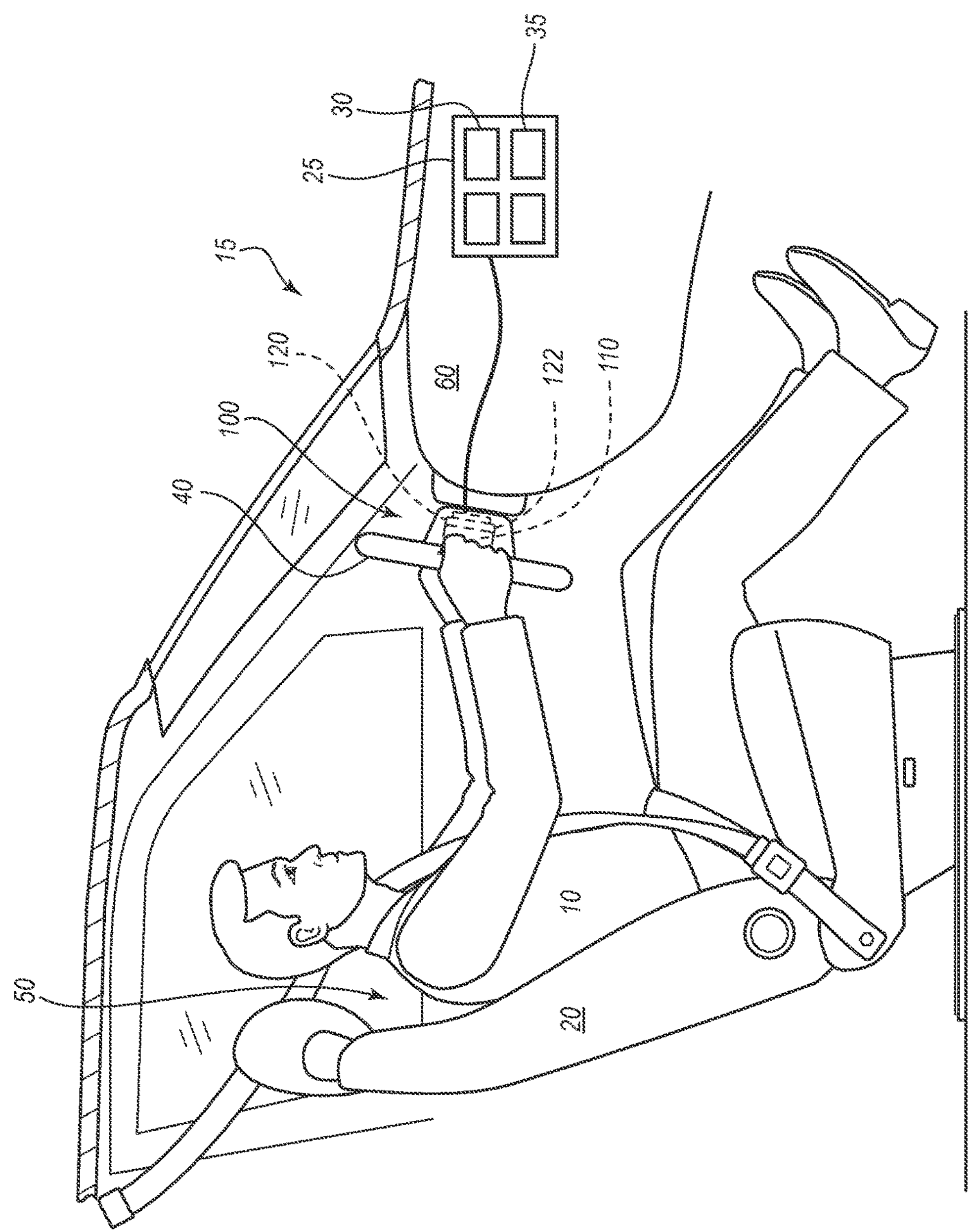
FIG. 1 is a side view of an interior side of a vehicle having an inflatable airbag system depicted in an undeployed configuration, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other.

Inflatable airbag systems are widely used to minimize occupant injury in a collision scenario. Airbag modules or assemblies have been installed at various locations within a vehicle, including, but not limited to, in the steering wheel or the instrument panel, within the side doors or side seats, adjacent to the roof rail of the vehicle, in an overhead position, or at the knee or leg position. In the following disclosure, "airbag" generally refers to a frontal airbag.

Frontal airbags are typically installed in the steering wheel and/or instrument panel of a vehicle. During installation, the airbags are rolled, folded, and/or otherwise put in a compressed undeployed state, and are retained in that undeployed state behind a cover. During a collision event, vehicle sensors trigger the activation of an inflator, which rapidly fills the airbag with inflation gas. The airbag rapidly changes conformations from the undeployed configuration to an expanded or deployed configuration. As disclosed herein, the expanded or deployed configuration of the airbag may be at least partially determined by one or more positioning members. For example, through use of one or more positioning members, the airbag can deploy in a first configuration in response to a frontal collision event and a second configuration in response to an oblique collision event. The one or more positioning members may include one or more tethers.

The positioning members may, in some embodiments, be adjusted by a positioning member adjustment mechanism. For example, the positioning members may be one or more tethers and the adjustment mechanism may adjust a position, a location, a length, and/or an orientation of the one or more positioning members (e.g., tethers) to control and/or adapt the conformation of the airbag in the deployed configuration. For example, in response to a frontal or substantially frontal collision event, the positioning member adjustment mechanism(s) may allow the one or more positioning members to remain in a default configuration. In response to an oblique collision event, the positioning member adjustment mechanism(s) may adjust the configuration of the one or more positioning members into a second configuration. In other embodiments, the positioning member adjustment mechanism(s) may adjust the configuration of the one or more positioning members in a frontal collision event, in an oblique collision event, or in response to any collision event. Adjusting the configuration of the positioning members may change the conformation of the airbag and improve the effectiveness of the inflatable airbag system.

The positioning members may receive information concerning a type of a collision event (e.g., frontal or oblique) from a control unit. The control unit may comprise one or more vehicle sensors. The vehicle sensors may detect an impact ration and/or an impact angle of the collision event. Additionally, the vehicle sensors may detect the extent of the impact. For example, the vehicle sensors may determine if the impact of the collision event is substantially longitudinal and/or lateral. In some embodiments the inflatable airbag system may be installed inside of a steering wheel. Sensors may also detect the angle of rotation of the steering wheel (also referred to as the rotational angle of the steering wheel). Information from the vehicle sensors may be communicated to the positioning member adjustment mechanism(s). The sensor information may be relayed via the control unit and/or communicated directly to the positioning member adjustment mechanism(s). Depending on the information from the control unit, the airbag may deploy in a first configuration, a second configuration, a third configuration, or other configurations.

Some embodiments disclosed herein can provide improved positioning, cushioning, and/or safety to occupants involved in particular types of collisions. For example, some embodiments can be particularly suited to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test(s). The conditions for the IIHS small overlap front crash test and the NHTSA oblique impact test are disclosed in the Insurance Institute for Highway Safety, *Small Overlap Frontal Crashworthiness Evaluation Crash Test Protocol* (*Version II*) (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

As described above, the lateral component of the post-collision trajectory of the one or more occupants runs perpendicular to the longitudinal component, and is parallel to the surface of the road below the vehicle. In an oblique collision, the lateral component of the post-collision trajectory of the one or more occupants may be greater than or less than the longitudinal component, and may cause the one or more occupants to travel either inboard (i.e., toward the center of the vehicle), or outboard (i.e., toward the outside of the vehicle, or toward the nearest vehicle side panel).

In an oblique collision, the lateral component of the post-collision trajectory of the one or more occupants can cause an occupant to contact a deployed airbag off of the center of the airbag, or deflect laterally off of the airbag, thereby decreasing the effectiveness and utility of the inflatable airbag system. The one or more occupants in the oblique collision who laterally deflect off of a deployed airbag could then strike another surface of the vehicle, such as an instrument panel or a window, which may result in injury to the one or more occupants. Violent or otherwise harmful head and neck rotation of an occupant may also result from laterally deflecting off of an airbag. As disclosed herein, manipulation of a deployed configuration of an airbag, such as during or after an oblique collision, by the use of one or more vents may prevent the one or more occupants from deflecting, or rolling, off of the airbag, thereby reducing a risk of injury to the one or more occupants.

FIG. 1 is a side view of an interior of a vehicle 15 having an inflatable airbag system 100, according to one embodiment. An occupant 10 is seated on a seat 20 within the vehicle 15. The occupant 10 is shown in a normal seating position 50 (i.e., the position typically occupied by an occupant of the vehicle 15; a position in which the vehicle 15, including the seat 20, is designed and configured to carry an occupant). The inflatable airbag system 100 is mounted in a steering wheel 40 of the vehicle 15. FIG. 1 depicts an inflatable airbag 110 of the inflatable airbag system 100 in an undeployed (e.g., rolled/folded) configuration.

The inflatable airbag system 100 may be coupled to or include a control unit 25, which may include or be coupled to one or more sensors, such as impact angle detection sensors 30 and/or steering wheel angle sensors 35. In some embodiments the steering wheel angle sensors 35 may be separate from the control unit 25, such as disposed within the steering wheel 40 or steering column of the steering wheel 40.

As shown in FIG. 1, the inflatable airbag system 100 can be configured to be mounted at a frontal region of the vehicle 15 to provide frontal crash protection for an occupant 10. For example, in the illustrated embodiment, the inflatable airbag system 100 is mounted on the driver's side of a vehicle 15 in the steering wheel 40 to provide frontal crash protection for a driver of the vehicle 15. In other embodiments, the inflatable airbag system 100 can be mounted on the passenger side of the vehicle 15, for example, in an instrument panel 60.

In some embodiments, before or during deployment of the airbag 110, the impact angle detection sensors 30 collect or otherwise provide data as to the type of collision that has occurred, such as by detecting collision conditions. In particular, the impact angle detection sensors 30 may electronically signal to the control unit 25 the type of collision event that has occurred or may provide data that may be used by the control unit 25 to determine the type of collision event that has occurred.

In addition, the control unit 25 may also include and/or be coupled to one or more steering wheel angle sensors 35 that detect an angle of rotation of the steering wheel 40. For example, if the sensors 30 signal a frontal collision event, the airbag 110 may deploy in a first configuration (e.g., see FIG. 2A). If the sensors 30 signal an oblique collision event, the airbag 110 may deploy in a second configuration (e.g., see FIG. 2B). Deployment to the second configuration may also depend on the rotational angle of the steering wheel 40 as detected by the steering wheel angle sensors 35. Various types of sensors can be used, including, but not limited to, deceleration sensors, mechanical inertia sensors, and accelerometers.

In some embodiments, the impact angle detection sensors 30 (e.g., accelerometers) can be used to detect the forces caused by the collision event, which may detect or otherwise be used to determine an impact angle of a collision. For example, a first sensor 30 can sense or detect a collision condition such as an amount of longitudinal impact applied to the vehicle 15, and a second sensor 30 can sense or detect a collision condition such as an amount of lateral impact applied to the vehicle 15. In such embodiments, the first sensor can send a signal to the control unit 25 when a threshold amount of longitudinal impact is detected, and the second sensor can send a signal to the control unit 25 when a threshold amount of lateral impact is detected. Described differently, the first sensor and second sensor can collectively detect an impact ratio and/or an impact angle of a collision event. In some embodiment, the impact ratio may be used to calculate or otherwise determine an impact angle. In other embodiments, the impact ration is a representation of or substitution for an impact angle. The impact ratio and/or the impact angle may be used to determine a type of collision (e.g., a frontal collision, an oblique collision).

In some embodiments, the impact from a frontal collision event can trigger a signal from the first sensor and not the second sensor, causing deployment of the airbag 110 in the first configuration. The impact from an oblique collision event can trigger signals from both the first and second sensors, causing deployment of the airbag 110 in the second configuration. In other embodiments, the impact angle detection sensors 30 may determine and provide the impact angle detected. In other embodiments, the impact angle detection sensors 30 may determine and provide the collision type.

Figure 2A:
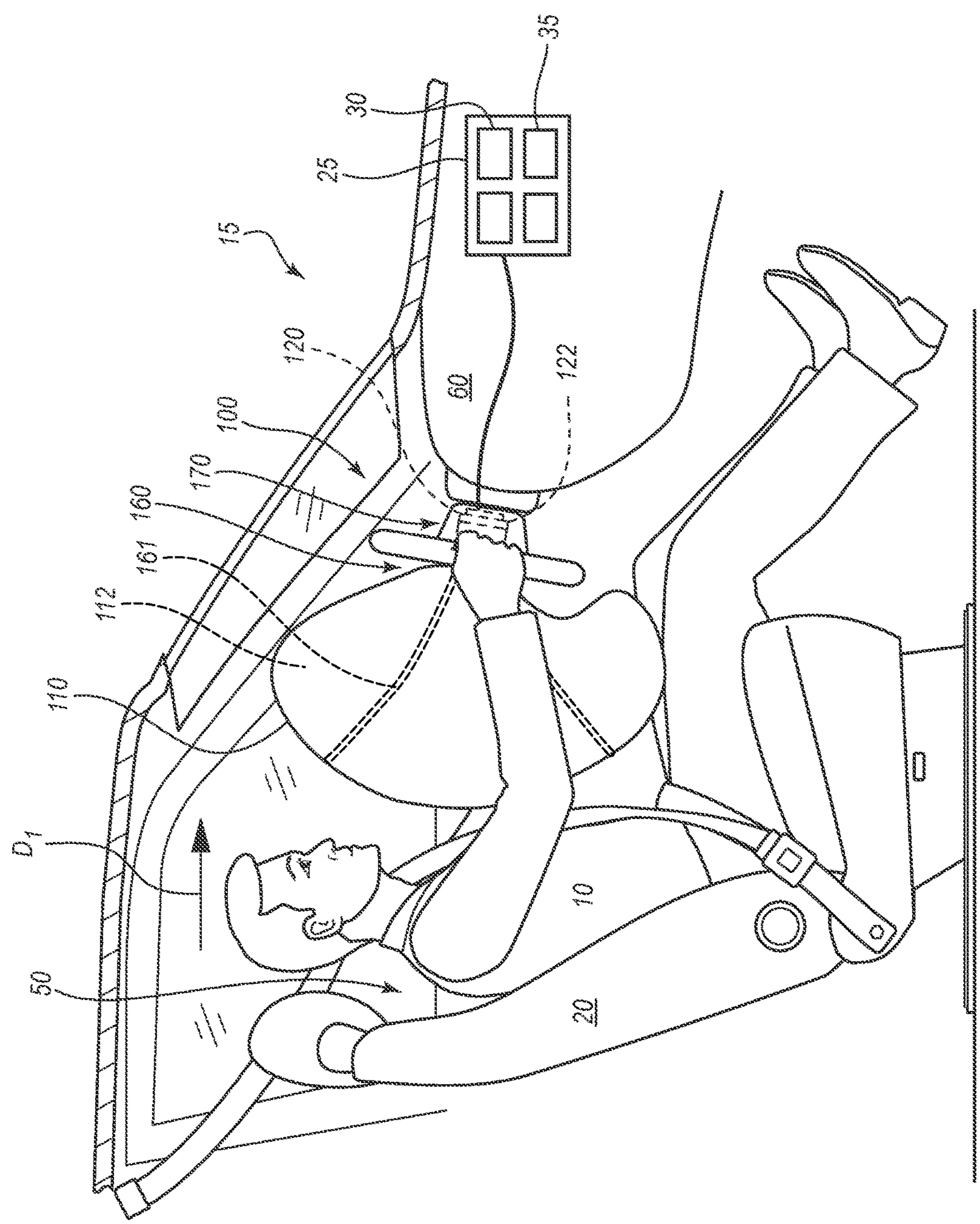
FIG. 2A is a side view of an interior side of a vehicle having an inflatable airbag system deployed in a first configuration, according to one embodiment of the present disclosure.
Figure 2B:
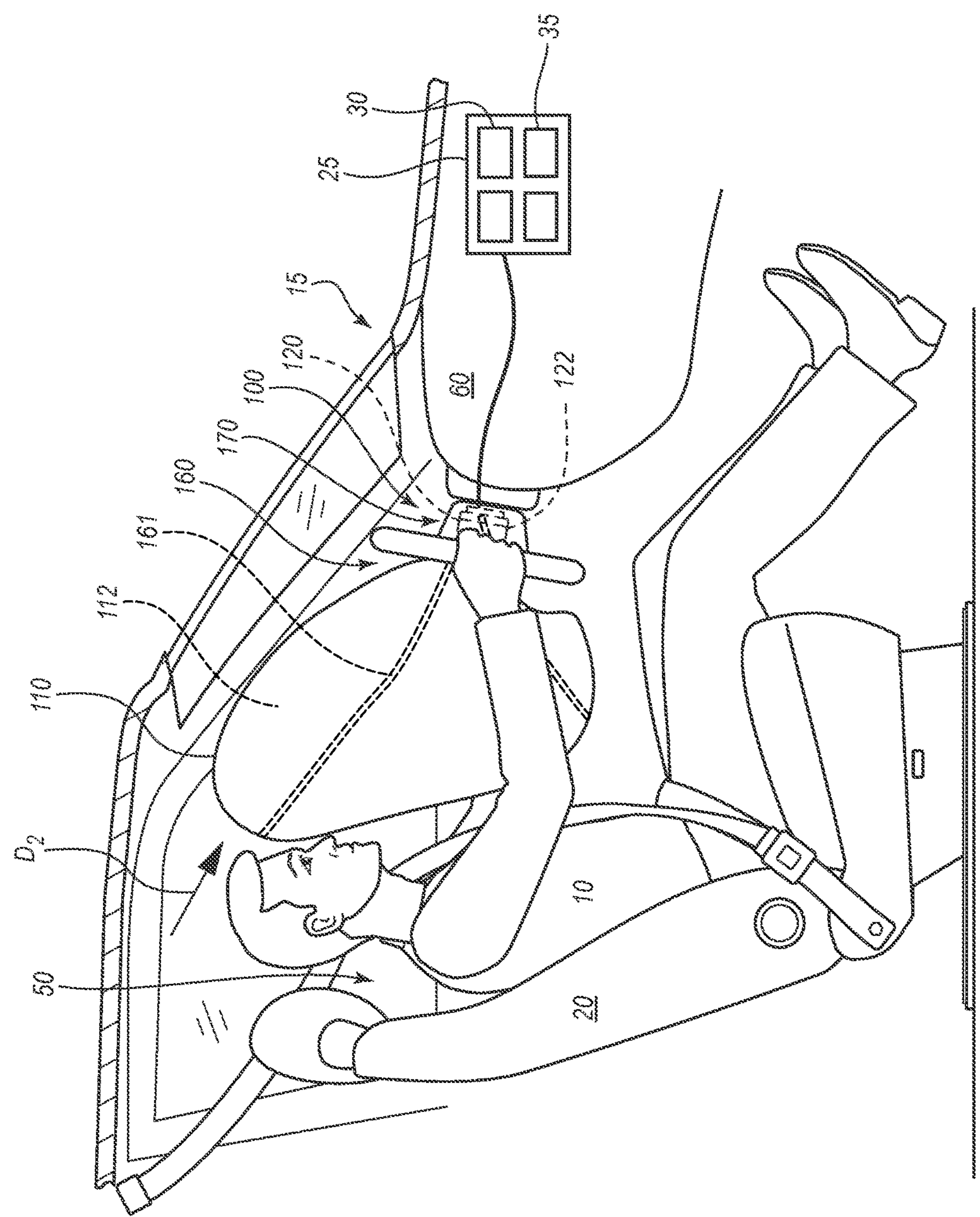
FIG. 2B is a side view of an interior side of a vehicle having an inflatable airbag system deployed in a second configuration, according to one embodiment of the present disclosure.

FIGS. 2A and 2B illustrate the inflatable airbag system 100 of FIG. 1 in a first deployed configuration and a second deployed configuration respectively. A deployed configuration can also be referred to as a deployed state, inflated state, or inflated configuration. The inflatable airbag system 100 comprises an inflatable airbag 110 (or inflatable airbag cushion), a housing 120, an inflator 122, and a positioning member 160.

The airbag 110 comprises one or more panels that define an inflatable chamber 112 to receive inflation gas from the inflator 122. The airbag 110 is configured to expand and, based on the positioning member 160, to be deployed in various modes or configurations, as briefly mentioned above. For example, as shown in FIG. 2A, the airbag 110 is configured to deploy in the first configuration in response to a frontal, or substantially frontal, collision event. In a frontal collision, the occupant travels in a forward direction $D_1$ and the airbag 110 in the first configuration provides crash protection for the occupant 10. As shown in FIG. 2B, the airbag 110 is configured to deploy in the second configuration in response to an oblique collision event. In an oblique collision event, the forces resulting from an impact angle may cause the occupant 10 to travel in an oblique direction $D_2$ that is both forward and inboard. The positioning member 160 may determine what the second configuration is and/or how the second configuration is achieved, based on the rotational angle of the steering wheel. The second configuration may provide oblique crash protection for an occupant 10 (e.g., a driver) during an oblique collision that causes the occupant 10 to travel in an inboard oblique direction $D_2$ (e.g., a direction having both a forward component and an inboard component). As can be appreciated, the inflatable airbag system 100 is not limited to only a first and a second configuration. For example, a third configuration may provide outboard oblique crash protection (e.g., for a driver during an oblique collision that causes the occupant 10 to travel in an outboard oblique direction, or a direction having both a forward component and an outboard component). The description of the first and the second configurations is meant to be illustrative and not limiting in scope.

The positioning member 160 may include a plurality of tethers 161 and one or more positioning member (e.g., tether) adjustment mechanisms 170 that are disposed in the interior of the airbag 110. The plurality of tethers 161 may be secured to an inner surface of one or more panels of the airbag 110. The one or more positioning member adjustment mechanisms 170 may, for example, adjust a length of one or more of the tethers 161 to achieve the first configuration and/or the second configuration of the airbag 110, based on the impact angle and the rotational angle of the steering wheel.

In some embodiments, the shape or conformation of the airbag 110 differs between the first and second configurations. The difference in shape may compensate for the expected motion or direction of travel of the occupant 10, from a normal seating position 50, in a collision event. In response to a frontal collision event, the direction of travel of an occupant 10 from the normal seating position 50 may be different, or in some instances substantially different, from the direction of travel of an occupant 10 in an oblique collision event. For example, the direction of travel of the occupant 10 from the normal seating position 50 in FIG. 2A is in only the forward direction $D_1$, or substantially the forward direction $D_1$. The direction of travel of the occupant 10 from the normal seating position 50 in FIG. 2B is in an oblique direction $D_2$ that is both forward and inboard. The difference in the forward direction $D_1$ and the oblique direction $D_2$ may be due to different forces acting on the vehicle 15 during a collision event. The difference in forces may be due to an oblique collision as compared to a head-on collision. The difference in forces can be detected by the impact angle detection sensors 30. Then, depending on the type of collision event, the inflatable airbag system 100 may deploy in the first or the second configuration.

Figure 3A:
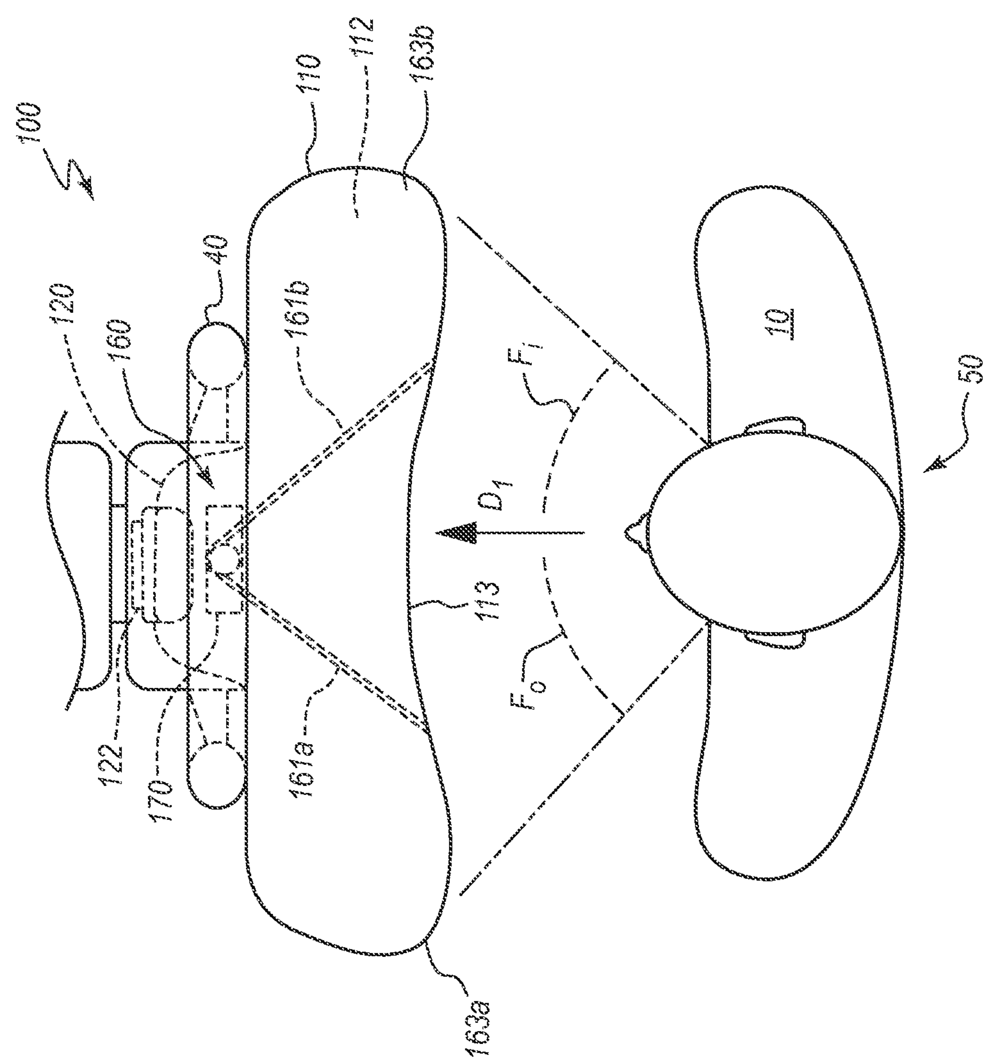
FIG. 3A is a top view of the inflatable airbag system of FIG. 1 showing the airbag deployed in a first configuration in response to a frontal collision event.
Figure 3C:
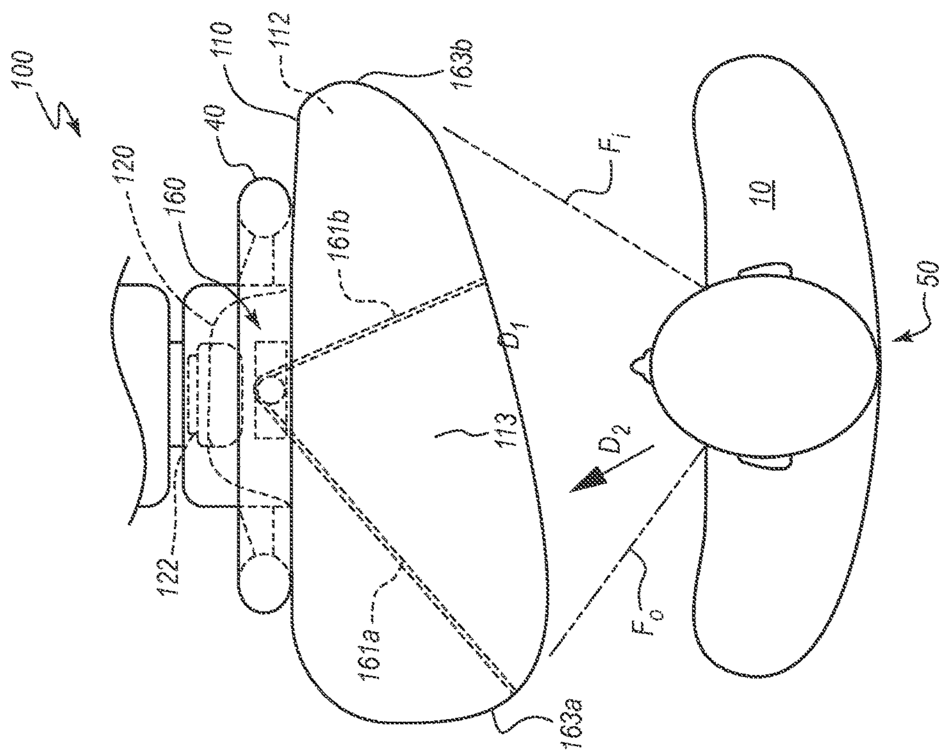
FIG. 3C is a top view of the inflatable airbag system of FIG. 1, with the airbag deployed in a third configuration in response to an oblique collision event that causes the occupant to travel in an outboard direction.
Figure 3B:
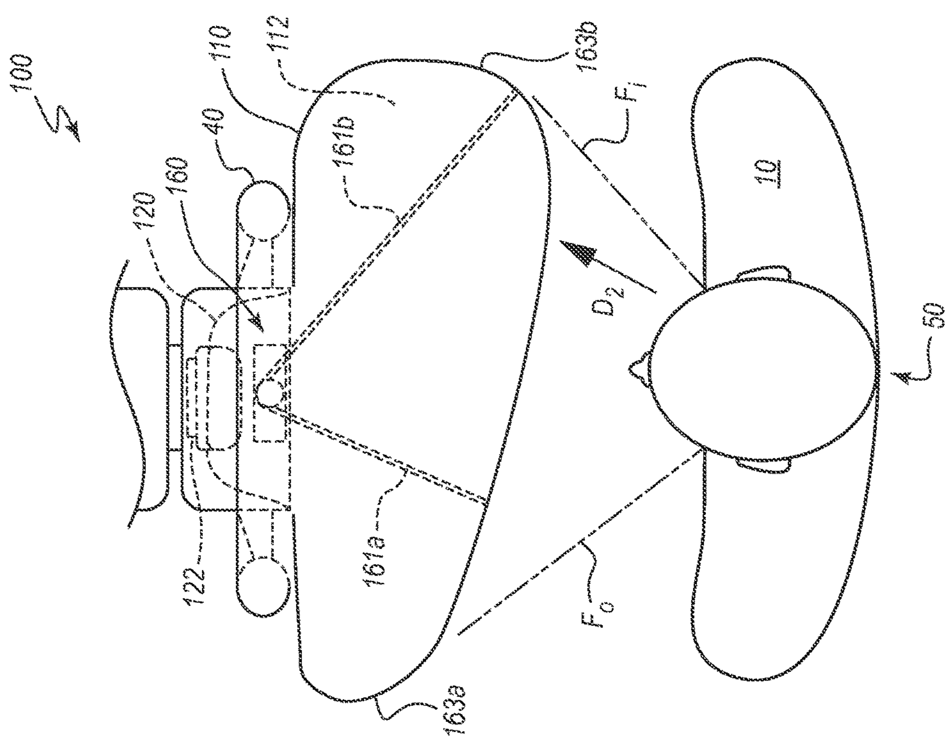
FIG. 3B is another top view of the inflatable airbag system of FIG. 1, with the airbag deployed in a second configuration in response to an oblique collision event that causes the occupant to travel in an inboard direction.

FIGS. 3A, 3B, and 3C provide further illustration that the occupant 10 may travel in varying directions, based on a type of collision (e.g., an impact angle or impact ration of a collision): a first or forward direction $D_1$ from the normal seating position 50 in the event of an frontal collision, a second or inboard oblique direction $D_2$ in the event of an inboard oblique collision event, and a third or outboard oblique direction $D_3$ in the event of an outboard oblique collision event.

FIG. 3A is a top view of the inflatable airbag system 100 of FIG. 1 with the airbag 110 deployed in the first configuration in response to a purely frontal collision event. The occupant's 10 expected direction of travel from the normal seating position 50 may be in a purely forward direction $D_1$ or substantially or mostly forward direction $D_1$. Accordingly, the positioning member 160 adjusts or maintains the airbag 110 in the first configuration. More particularly, the positioning member adjustment mechanism 170 adjusts or maintains the plurality of tethers 161*a*, 161*b* (collectively 161) of the positioning member 160 to cause the airbag 110 to deploy in the first configuration. In FIG. 3A, the plurality of tethers 161 are maintained at a generally similar or uniform length or shape to produce a first configuration of the airbag 110 that is substantially symmetric and that provides a uniform rear surface 113 to receive the occupant 10. In the illustrated first configuration of FIG. 3A, the symmetrical shape of the airbag 110 is such that the rear surface 113 will be uniform and/or substantially the same relative to the occupant 10 at any rotational angle of the steering wheel.

FIG. 3B illustrates the inflatable airbag system 100 with the airbag 110 deployed in a second configuration in response to an oblique or substantially oblique collision event that causes the occupant 10 (e.g., the driver of the vehicle) to travel in an inboard oblique direction $D_2$ from the normal seating position 50. The inboard oblique direction $D_2$ is both forward and inboard, and thus oblique to the forward direction $D_1$. The occupant 10 may travel in the inboard oblique direction $D_2$ from the normal seating position 50 as a result of forces on the vehicle during the oblique collision event.

An angle from the normal seating position 50 to a lateral edge (e.g., inboard edge 163*b*, outboard edge 163*a*) of the airbag 110 in a deployed configuration may be referred to as a function angle. In other words, the airbag 110 in an inflated deployed state provides a function angle $F_i$ formed from the normal seating position 50 to the inboard edge 163*b*, and a function angle $F_o$ formed from the normal seating position 50 to the outboard edge 163*a*. The function angle $F_i$, $F_o$ (collectively F) defines a range of functioning of the airbag 110 or a range over which the airbag 110 provides crash protection. The function angle F may be a maximum angle that the airbag 110 can fulfill an expected performance. If the occupant's 10 direction of travel relative to the airbag 110 is within the function angle F, the occupant 10 will impact the airbag 110. By contrast, if the occupant's 10 direction of travel is outside of the function angle F, the occupant 10 will miss or not impact the airbag 110. The effectiveness of the airbag 110 in receiving and/or restraining the occupant 10 during a collision event decreases as the occupant's 10 direction of travel approaches the extremes or edges of the function angle F.

When the occupant 10 travels in a purely forward direction, such as the direction $D_1$ of FIG. 3A, the function angle F can be relatively small and the airbag 110 would still remain effective to provide crash protection for the occupant 10. However, when the occupant 10 travels in an oblique direction $D_2$ as shown in FIG. 3B, a small function angle F can result in reduced protection of the occupant 10. In some cases, a typical function angle F is not sufficiently wide to allow adequate crash protection for an occupant 10 moving in an oblique direction. If the function angle F can be increased during an oblique collision event, protection is increased for the occupant 10 traveling in the oblique direction $D_2$. More specifically, if the function angle $F_i$ can be increased during an inboard oblique collision, occupant protection increases. And if the function angle $F_o$ can be increased during an outboard collision, occupant protection increases. A second configuration in which the inboard edge 163*b* is moved or positioned more rearward toward or nearer the seating position 50 and/or more outward laterally relative to the seating position 50 widens the function angle $F_i$.

The positioning member 160 may at least partially control the conformation of the airbag 110. The positioning member 160 may comprise one or more tethers 161 and a positioning member adjustment mechanism 170. The tethers 161 may, in some embodiments, extend from the positioning member adjustment mechanism 170 and attach to the inner surface of the airbag 110 at one or more locations. In addition, the tethers 161 of the positioning member 160 may be designed to function in pairs, in groups, or independently. The expansion of the airbag 110 may be restricted, adjusted, or otherwise impacted by the tethers 161 of the positioning member 160 at the one or more locations. By altering the properties of the tethers 161 (e.g., the length, connection, location, position, angle, and/or orientation), the positioning member 160 may alter the conformation of the inflatable airbag system 100 to achieve an appropriate second configuration.

As shown in FIG. 3B, shortening the length of a first tether 161*a*, and/or lengthening a second tether 161*b* alters a shape of the airbag 110. The positioning member adjustment mechanism 170 may extend and/or retract one or more tethers 161 of the positioning member 160 in order to alter the conformation or configuration of the inflatable airbag system 100. A greater portion of the airbag 110, or a greater portion of inflation gas within the airbag 110, is positioned more inboard and in front of, or in line with, the oblique direction $D_2$ of travel of the occupant 10. This adjustment of the plurality of tethers 161 to cause conformation of the airbag 110 to a second configuration also increases or widens the function angle $F_i$. The adjustment of the plurality of tethers 161 causes the airbag 110 to expand to a second configuration in which the inboard edge 163*b* moves rearward toward or nearer the seating position 50 and/or outward laterally relative to the seating position 50, which widens the function angle $F_i$. As shown in FIG. 3B, the function angle $F_i$ may be increased by deploying the inflatable airbag system 100 in the second configuration.

FIG. 3C illustrates the inflatable airbag system 100 with the airbag 110 deployed in a third configuration (which may also be considered a different second configuration) in response to an outboard oblique or substantially oblique collision event. The outboard oblique collision event may cause the occupant 10 to travel in an outboard oblique direction $D_3$ from the normal seating position 50. The outboard oblique direction $D_3$ is both forward and outboard, and thus oblique to the forward direction $D_1$. The occupant 10 may travel in the outboard oblique direction $D_3$ from the normal seating position 50 as a result of forces on the vehicle during the oblique collision event. The forces may be detected and the positioning member 160 may cause the inflatable airbag system 100 may deploy in the third configuration to better receive the occupant 10, in a manner similar to FIG. 3B.

The positioning member 160 can cause the airbag 110 to deploy to a second configuration based on a rotational angle of the steering wheel 40. Stated differently, how the positioning member 160 causes the airbag 110 to deploy in a second configuration depends on a rotational angle of the steering wheel 40. As noted above, the second configuration is achieved by adjustment of the positioning member 160. If a desired second configuration is a configuration that provides inboard oblique collision protection for an occupant 10, that desired configuration is achieved differently if the steering wheel 40 is at a normal position (e.g., 0 degrees) or turned at a different rotational angle (e.g., 45 degrees, 90 degrees, 180 degrees). Accordingly, the positioning member 160 is adjusted, and thereby positions the airbag 110, based on a rotational angle of the steering wheel 40. The rotational angle of the steering wheel 40 may be detected by steering wheel angle sensors 35 (FIG. 1). In other words, if the steering wheel 40 is at a normal position or angle (e.g., 0 degrees), the second configuration shown in FIG. 3B may be achieved by adjustment of a first set of tethers 161 of the positioning member 160. Whereas, if the steering wheel 40 is at another rotational angle (e.g., 45 degrees), the second configuration shown in FIG. 3B is achieved by adjustment of a second set of tethers 161 of the positioning member 160.

Figure 7A:
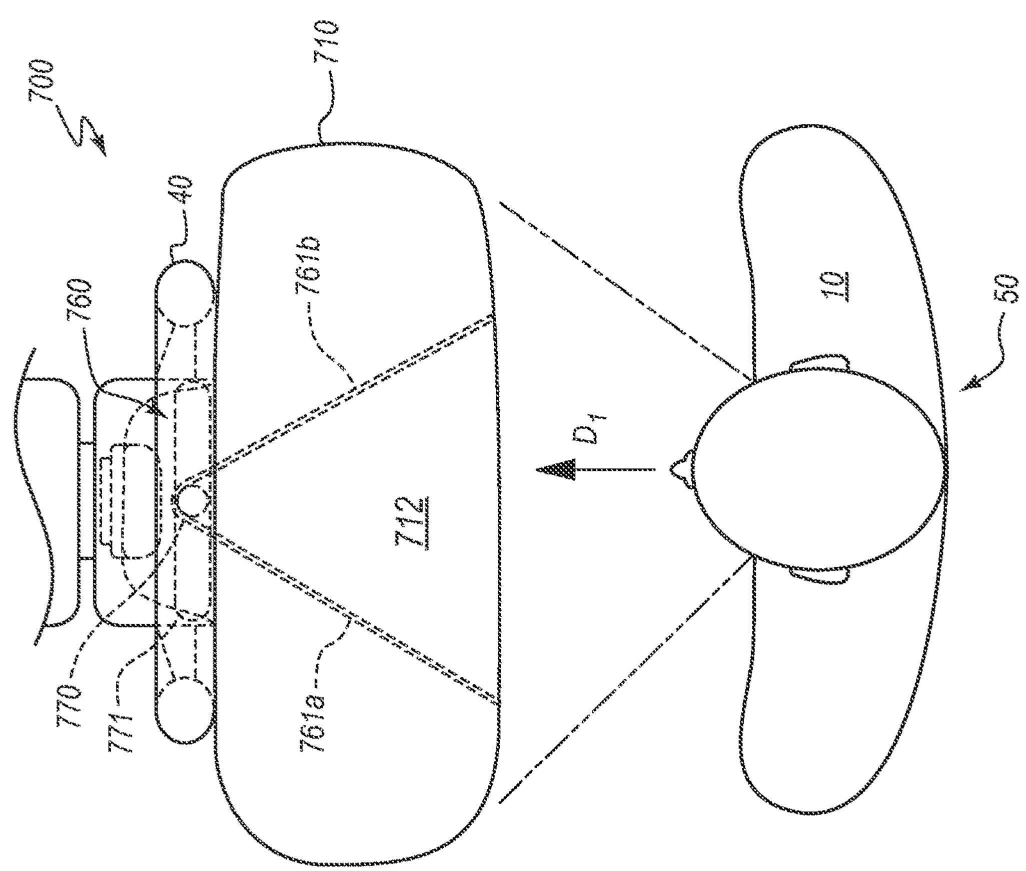
FIG. 7A is a top view of an inflatable airbag system, according to another embodiment, in a first configuration.

Adjustment of the positioning member 160 may be controlled or accomplished through one or more positioning member adjustment mechanisms 170. The positioning member adjustment mechanism 170 may adjust the location, position, orientation, or functionality of the positioning member 160. For example, in one embodiment the positioning member adjustment mechanism 170 may comprise a motor. The motor may be used to retract or extend the tethers 161 of the positioning member 160. The motor may, in other embodiments, be used to alter the location of the positioning member 160. In other embodiments the positioning member adjustment mechanism 170 may cause the tethers 161 of the positioning member 160 to retract, extend, and/or change location without the use of a motor. The positioning member adjustment mechanism 170 may, in some embodiments, comprise a track which allows the positioning member 160 to slide into a new position, as shown in FIGS. 7A-CC. In another embodiment, the positioning member adjustment mechanism 170 may comprise a cutter. The positioning member adjustment mechanism 170 may then adjust the positioning member 160 by cutting one or more of the tethers 161 of the positioning member 160. In still another embodiment, the positioning member adjustment mechanism 170 may cause the positioning member 160 to rotate around an axis.

Figure 4:
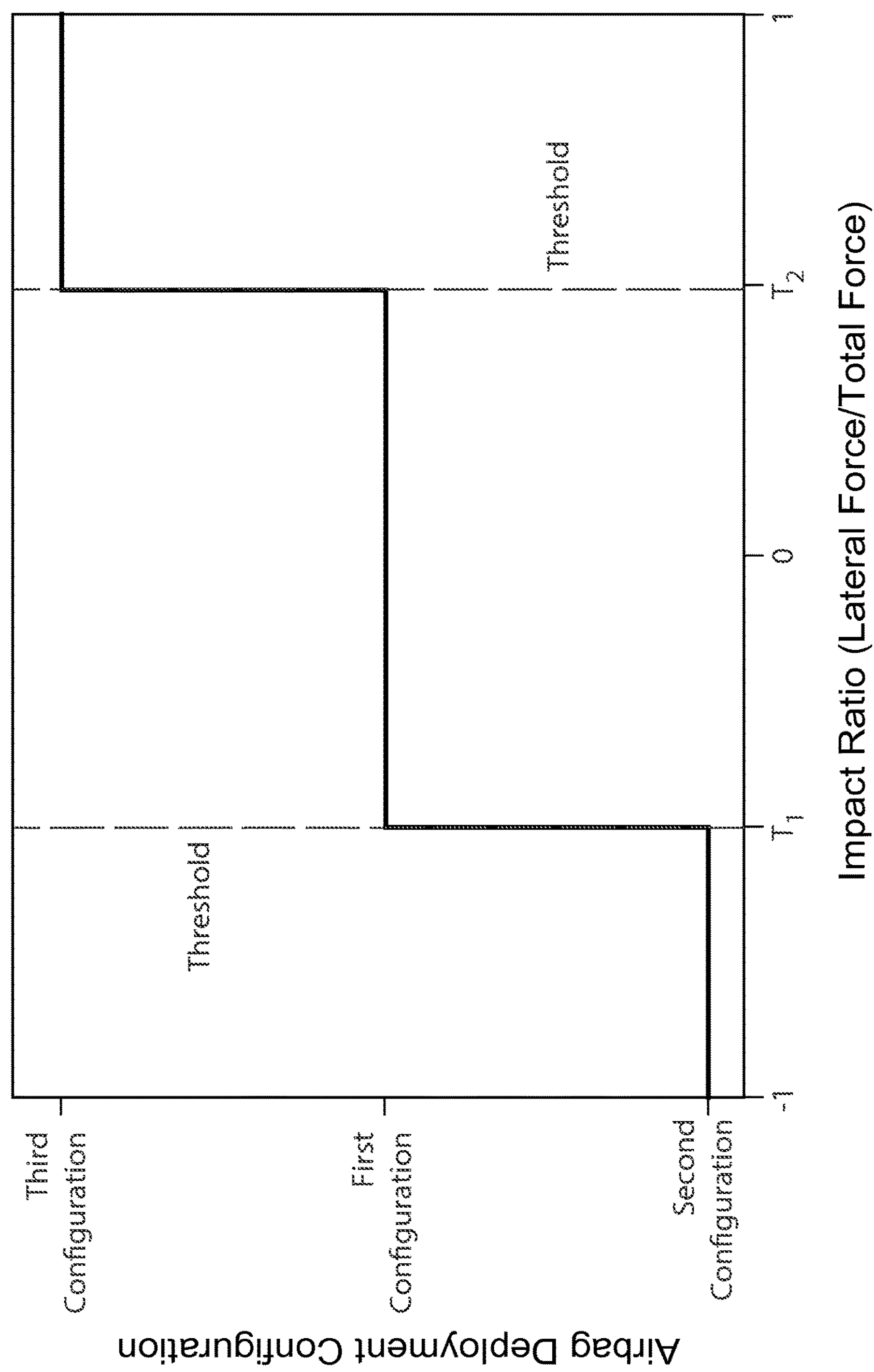
FIG. 4 is a graphical representation diagramming an inflatable airbag system configuration, according to one embodiment, based on an impact ratio from a collision event.

FIG. 4 depicts a graphical representation diagramming an inflatable airbag system configuration, according to one embodiment, based on an impact ratio from a collision event. The horizontal axis, or "x" axis represents a continuum of modes of collision as defined by an impact ratio, which is defined by a lateral impact force divided by a total impact force. In oblique collisions, the lateral impact force may have a negative or positive. Whether a lateral impact force value is negative or positive may depend on the direction of the lateral impact force vector with respect to the vehicle. For example, if the vehicle is in a collision wherein the driver side of the vehicle collides with another vehicle or object, the lateral impact force may be represented by a negative value. If the vehicle is in a collision wherein the passenger side of the vehicle collides with another vehicle or object, the lateral impact force may be represented by a positive value. An impact ratio of 0 represents a frontal collision with no lateral impact force, and an impact ratio of 1 or −1 represents a lateral impact, wherein all of the impact force is oriented in a lateral direction.

As mentioned above, an inflatable airbag system may be coupled to or include a control unit. The control unit may comprise one or more vehicle sensors to detect if the impact from a collision event is substantially oblique or merely frontal. The detection may be accomplished by detecting or otherwise determining an impact ratio. The impact ratio may be a ratio of a lateral force to a total force. The total force may include both a lateral component and a longitudinal component. In other words, the total force may include both lateral force(s) and longitudinal force(s). Accordingly, a comparison of the magnitude of the lateral force to the total force may yield an impact ratio that is useful in determining whether a collision event is substantially frontal or oblique.

For example, if the magnitude of the impact ratio is less than a first threshold $T_1$ and a second threshold $T_2$, the inflatable airbag system may deploy in a first configuration. If the magnitude of the impact ratio exceeds (which in FIG. 4 is more negative than) the first threshold $T_1$, the inflatable airbag system may deploy in a second configuration. The second configuration may be similar to the configuration shown in FIG. 3B to provide inboard oblique crash protection. If the impact ratio exceeds (which in FIG. 4 is more positive than) the second threshold $T_2$, the inflatable airbag system may deploy in a third configuration. The third configuration may be similar to the configuration shown in FIG. 3C to provide outboard oblique crash protection.

Stated differently, if the magnitude of the impact ratio is less than a first threshold $T_1$ and a second threshold $T_2$, the collision may be substantially frontal, such that any lateral forces may be small and may not cause an occupant to travel in an oblique direction. If the magnitude of the impact ratio exceeds the first threshold $T_1$, and thus has a lateral component to the left (e.g., an oblique collision on the right side of the vehicle), which causes travel of the occupant in an oblique direction to the right (or inboard on a left-side driver vehicle), the inflatable airbag system may deploy in a second configuration to provide inboard oblique collision protection. If the impact ratio exceeds the second threshold $T_2$, and thus has a lateral component to the right (e.g., an oblique collision on the left side of the vehicle), which causes travel of the occupant in an oblique direction to the left (or outboard on a left-side driver vehicle), the inflatable airbag system may deploy in a third configuration to provide outboard oblique collision protection.

In other words, the airbag system may deploy the airbag in a first configuration for substantially frontal collisions (or other non-oblique collisions), a second configuration for inboard oblique collision events, and a third configuration for outboard oblique collision events.

In other embodiments, the impact ratio may be a ratio of lateral force to longitudinal force. Other ratios may also be utilized and/or substituted to determine an oblique collision.

In the graph of FIG. 4, the inflatable airbag system includes or provides discrete configurations. However, an infinite number of configurations may be possible as will be described.

Figure 5:
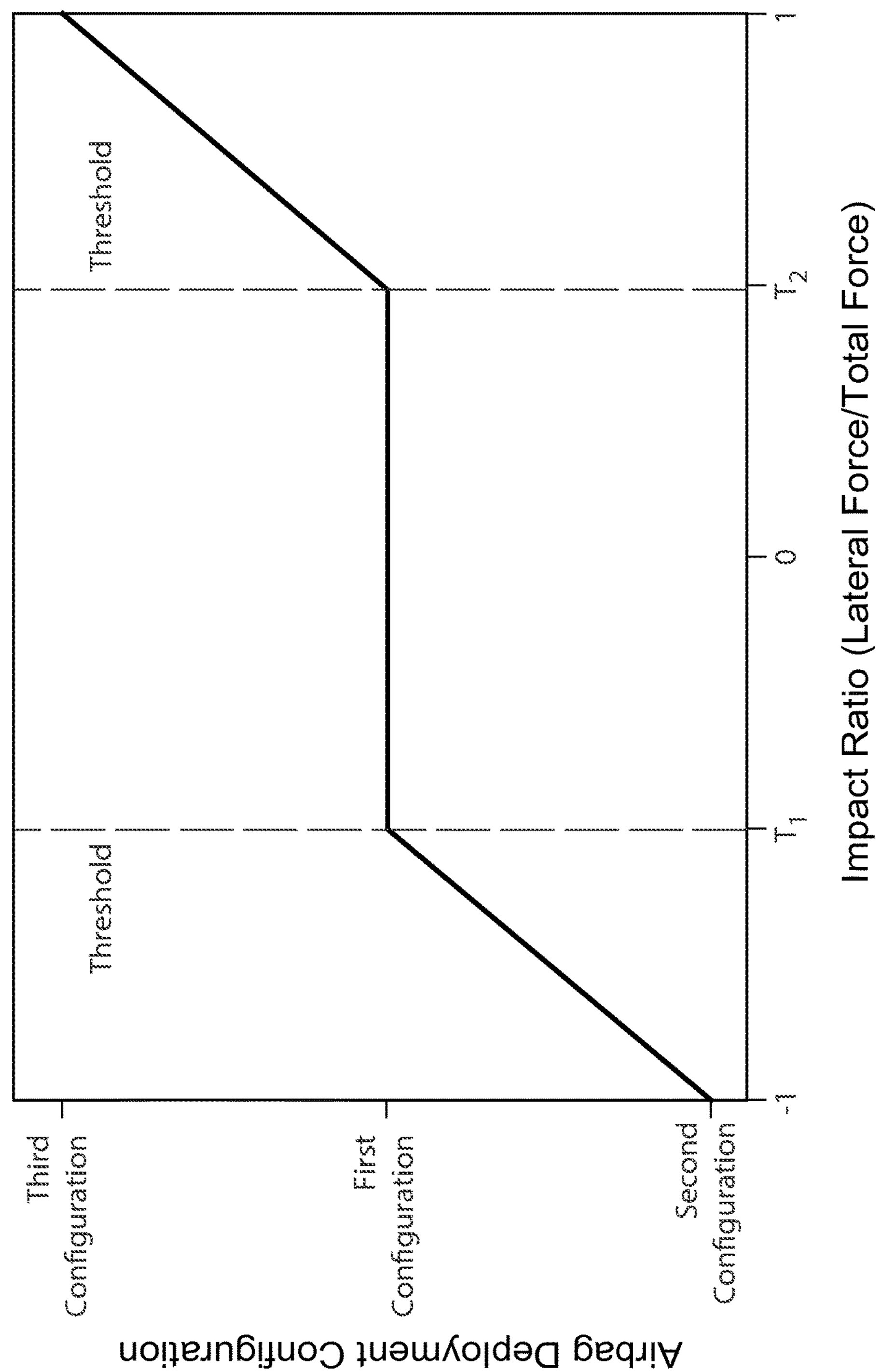
FIG. 5 is a graphical representation diagramming an inflatable airbag system configuration, according to another embodiment, based on an impact ratio from a collision event.

FIG. 5 is a graphical representation diagramming an inflatable airbag system configuration, according to another embodiment, based on an impact ratio from a collision event. The inflatable airbag system includes or provides infinite configurations. Similar to the embodiment of FIG. 4, if the magnitude of the impact ratio is less than a first threshold $T_1$ and a second threshold $T_2$, the inflatable airbag system may deploy in a first configuration.

Somewhat differently, if the magnitude of the impact ratio exceeds (which in FIG. 5 is more negative than) the first threshold $T_1$, the inflatable airbag system may deploy in a second configuration, which may be one of numerous possible second configurations. The second configuration may be similar to the configuration shown in FIG. 3B to provide inboard oblique crash protection. The second configuration varies based on the magnitude of the impact ratio. In other words, if the impact ratio is small, the second configuration may more closely resemble the first configuration, and if the impact ratio is high, the second configuration is more adjusted and less resembles the first configuration.

Similarly, if the impact ratio exceeds (which in FIG. 5 is more positive than) the second threshold $T_2$, the inflatable airbag system may deploy in a third configuration, which may be one of numerous possible third configurations. The third configuration may be similar to the configuration shown in FIG. 3C to provide outboard oblique crash protection. The third configuration varies based on the magnitude of the impact ratio. In other words, if the impact ratio is small, the third configuration may more closely resemble the first configuration, and if the impact ratio is high, the third configuration is more adjusted and less resembles the first configuration.

Figure 6:
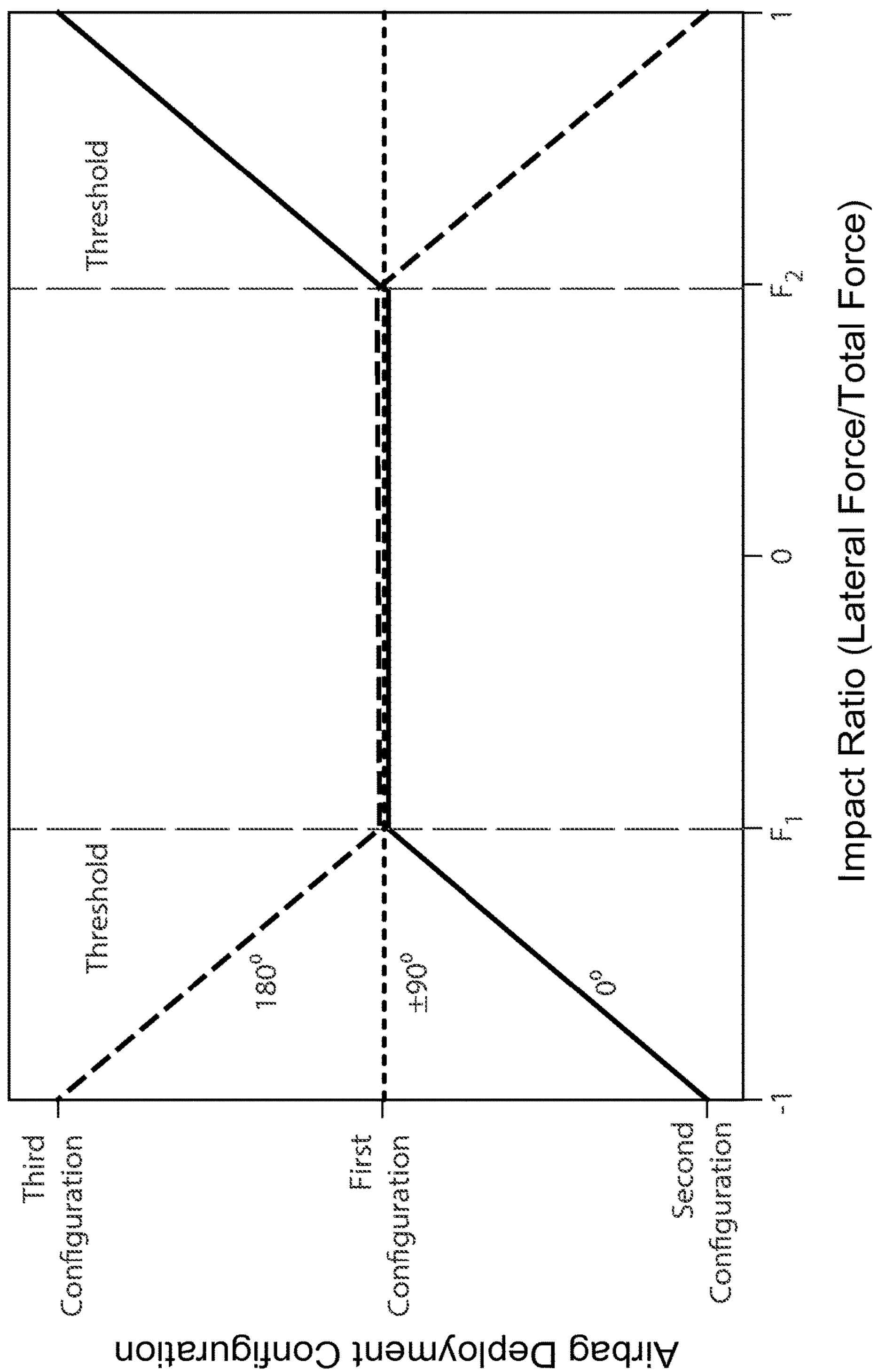
FIG. 6 is a graphical representation diagramming an inflatable airbag system configuration, according to one embodiment, based on the impact ratio from a collision event and the angle of rotation of the steering wheel.

FIG. 6 is a graphical representation diagramming an inflatable airbag system configuration, according to one embodiment, based on the impact ratio from a collision event and the rotational angle of the steering wheel.

If the magnitude of the impact ratio is less than a first threshold $T_1$ and a second threshold $T_2$, the inflatable airbag system may deploy in a first configuration if the rotational angle of the steering wheel is 0 degrees.

If the magnitude of the impact ratio exceeds (which in FIG. 7 is more negative than) the first threshold $T_1$, and the rotational angle of the steering wheel is normal or 0 degrees, the inflatable airbag system may deploy in a second configuration, which may be one of numerous possible second configurations. The second configuration may be similar to the configuration shown in FIG. 3B to provide inboard oblique collision protection for an occupant. The second configuration varies based on the magnitude of the impact ratio. In other words, if the impact ratio is small, the second configuration may more closely resemble the first configuration, and if the impact ratio is high, the second configuration is more adjusted and less resembles the first configuration.

Deployment in the second configuration may also depend on the rotational angle of the steering wheel. As can be appreciated, if the steering wheel is turned 180 degrees, the second configuration would also be rotated 180 degrees and now have an opposite effect, or provide crash protection in an opposite direction (e.g., outboard instead of inboard). Accordingly, if the magnitude of the impact ratio exceeds the first threshold $T_1$, and if the steering wheel is turned 180 degrees, the inflatable airbag system may deploy in the third configuration to provide desired inboard oblique collision protection for an occupant.

If the impact ratio exceeds (which in FIG. 6 is more positive than) the second threshold $T_2$, and the rotational angle of the steering wheel is normal or zero degrees, the inflatable airbag system may deploy in a third configuration, which may be one of numerous possible third configurations. The third configuration may be similar to the configuration shown in FIG. 3C to provide outboard oblique crash protection. The third configuration varies based on the magnitude of the impact ratio. In other words, if the impact ratio is small, the third configuration may more closely resemble the first configuration, and if the impact ratio is high, the third configuration is more adjusted and less resembles the first configuration.

Deployment in the third configuration may also depend on the rotational angle of the steering wheel. As can be appreciated, if the steering wheel is turned 180 degrees, the third configuration would also be rotated 180 degrees and now have an opposite effect, or provide crash protection in an opposite direction (e.g., inboard instead of outboard). Accordingly, if the magnitude of the impact ratio exceeds the second threshold $T_2$, and if the steering wheel is turned 180 degrees, the inflatable airbag system may deploy in the second configuration to provide desired outboard oblique collision protection for an occupant.

If the rotational angle of the steering wheel is +90 degrees or −90 degrees, the airbag may simply be deployed in the first configuration, regardless of any oblique collision detection. The airbag may be deployed to the first configuration because deploying in either the second configuration or the third configuration may not increase the function angle of the airbag, due to the rotation of the steering wheel.

FIG. 7A is a top view of an inflatable airbag system 700, according to one embodiment, with the airbag 710 deployed in a first configuration in response to a frontal collision event. The airbag 710 comprises one or more panels that define an inflatable chamber 712 to receive inflation gas from an inflator. In the embodiment of FIG. 7A, the configuration is determined based on a positioning member 760. The positioning member 760 includes a plurality of tethers 761*a*, 761*b* (collectively 761) and a positioning member adjustment mechanism 770. In the system 700 of FIG. 7A, the positioning member adjustment mechanism 770 may be adjustable along a track 771. The configuration of the inflatable airbag system 700 may be adjusted and/or altered by the positioning member adjustment mechanism 770 moving along the track 771.

Figure 7C:
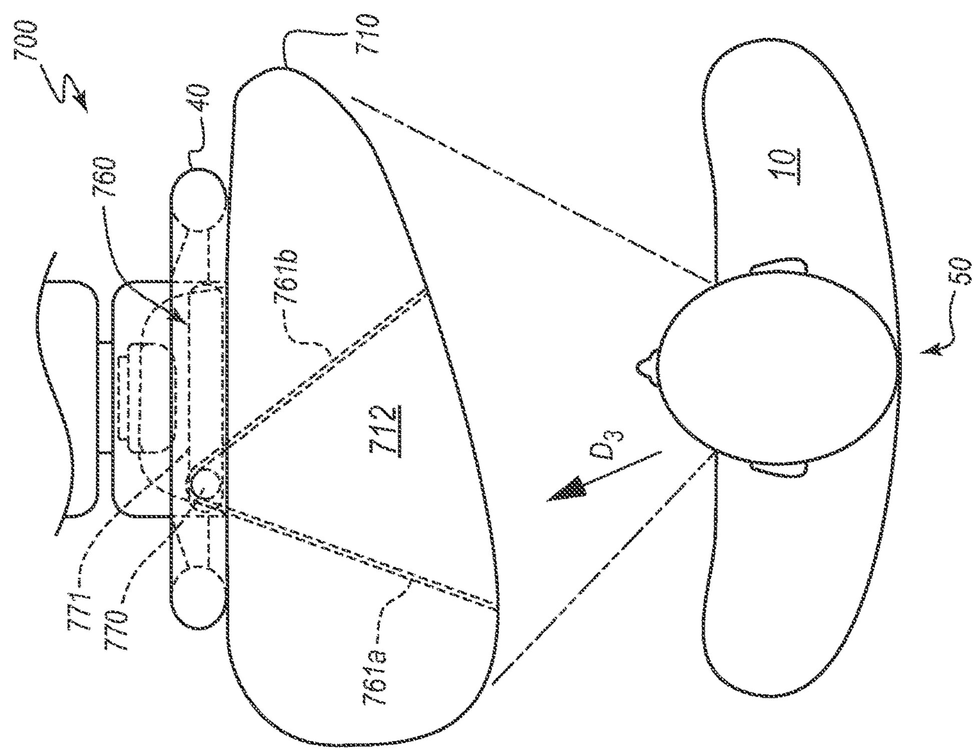
FIG. 7C is another top view of the inflatable airbag system of FIG. 7A, with the airbag deployed in a third configuration in response to an oblique collision event that causes the occupant to travel in an outboard direction.
Figure 7B:
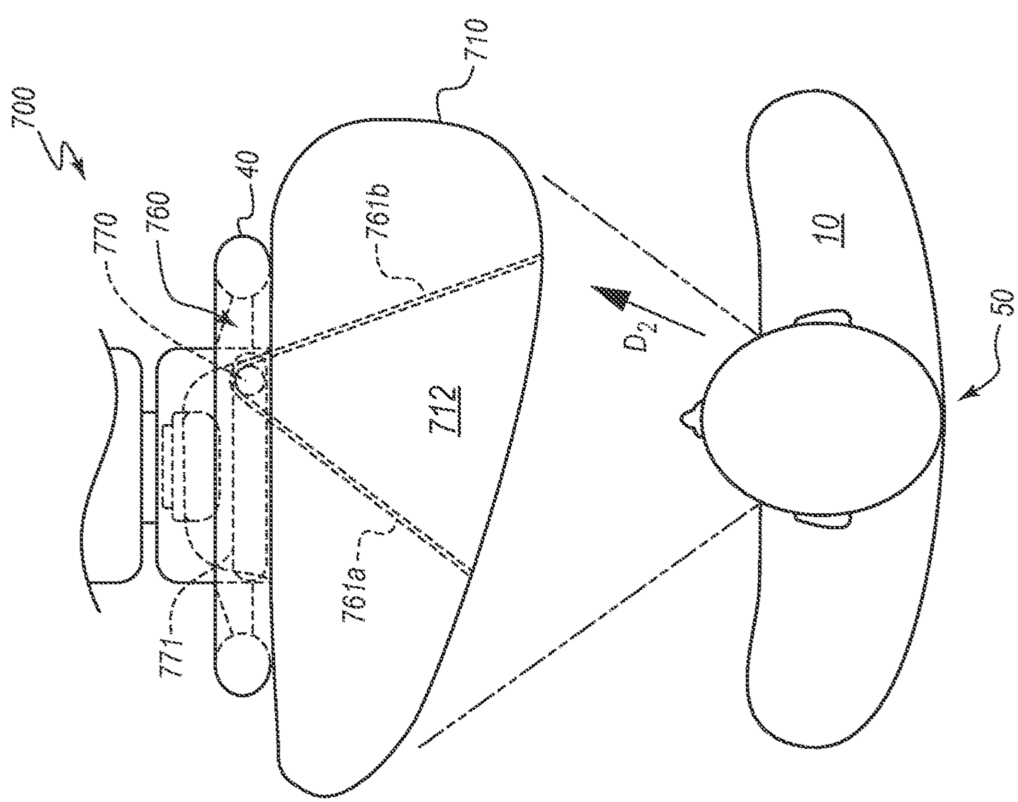
FIG. 7B is another top view of the inflatable airbag system of FIG. 7A, with the airbag deployed in a second configuration in response to an oblique collision event that causes the occupant to travel in an inboard direction.

FIG. 7B illustrates a top view of the inflatable airbag system 700 of FIG. 7A, deployed in a second configuration in response to an oblique or substantially oblique collision event. The second configuration shown in FIG. 7B is designed to receive an occupant 10 traveling in an inboard oblique direction $D_2$ from the occupant seating position 50. The positioning member 760 is adjusted to cause the airbag 710 to deploy in the second configuration. Specifically, the positioning member adjustment mechanism 770 has moved and is repositioned along the track 771 to the inboard side in order to adjust the conformation of the airbag 710 of the inflatable airbag system 700 into the second configuration.

FIG. 7C illustrates a top view of the inflatable airbag system 700 of FIG. 7A, deployed in a third configuration in response to an oblique or substantially oblique collision event. The third configuration shown in FIG. 7B is designed to receive an occupant 10 traveling in an outboard oblique direction $D_3$ from the occupant seating position 50.

Specifically, the positioning member adjustment mechanism 770 has moved and is repositioned along the track 771 to the outboard side in order to adjust the conformation of the airbag 710 of the inflatable airbag system 700 into the third configuration.

Figure 8:
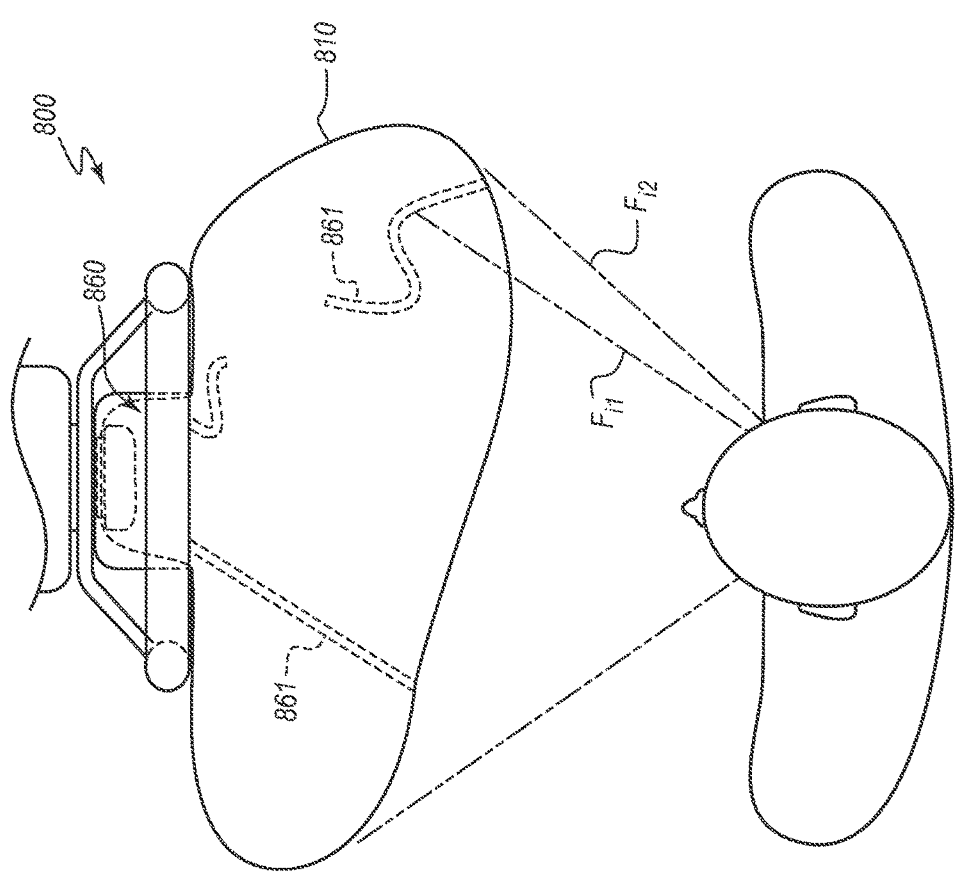
FIG. 8 is a top view of an inflatable airbag system, according to another embodiment of the present disclosure, with the airbag deployed in a second configuration in response to an oblique collision event.

FIG. 8 is a top view of an inflatable airbag system 800, according to another embodiment, with an airbag 810 deployed in a second configuration in response to an oblique collision event. The inflatable airbag system 800 includes a positioning member 860, which includes a plurality of tethers 861 and a positioning member adjustment mechanism that includes one or more tether cutters. The second configuration is achieved by a tether cutter cutting one or more of the plurality of tethers 861. Each of the tethers 861 may restrict expansion of the airbag 810 in a certain direction. Cutting specific tethers 861 may allow the airbag 810 to expand into a different configuration. For example, in response to a substantially oblique collision event, the positioning member 860 may cut one or more tethers 861 on the inboard side to allow the airbag 810 to expand more in the inboard direction. As shown in FIG. 8, expansion of the airbag 810 more in the inboard direction to the second configuration increases the function angle from a function angle $F_{i1}$ of the first configuration to a function angle $F_{i2}$ of the second configuration. The function angle $F_{i2}$ of the second configuration is wider than the function angle $F_{i1}$ of the first configuration.

Figure 9:
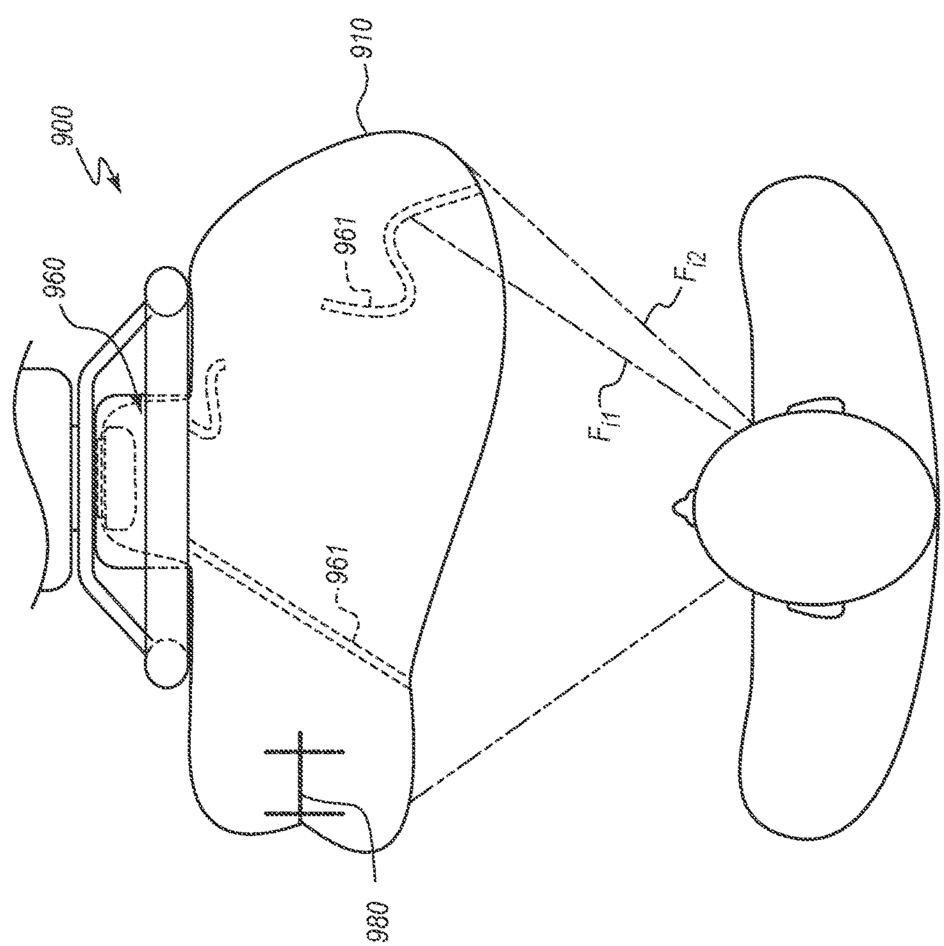
FIG. 9 is a top view of an inflatable airbag system, according to another embodiment of the present disclosure, with the airbag deployed in a second configuration in response to an oblique collision event.

FIG. 9 is a top view of an inflatable airbag system 900, according to one embodiment, with an airbag 910 deployed in a second configuration in response to an oblique collision event. The inflatable airbag system 900 includes a positioning member 960 and also one or more tear seams 980. The positioning member 960 conforms the airbag 910 to the second configuration by the cutting a tether 961 of the positioning member 960. The configuration is further achieved by a bursting of a tear seam 980 in the airbag 910. The tear seam 980 may comprise additional folds of the airbag material. The tear seam 980 may open (i.e., tear) in response to a sufficient amount of force on the tear seam 980, such as when a tether 961 is cut. When the tear seams 980 open, they may increase the initial volume of the airbag 910. For example, the positioning member 960 may cut one or more tethers 961 in response to a collision event. The cutting of the tether(s) 961 may create an area of increased expansion in the airbag 910 near or around the location of the one or more tethers 961 that were cut. The increased expansion may create an increased tension force on any tear seam(s) 980 proximate to the area of increased expansion, causing the tear seam(s) 980 to burst and unfold. As the tear seam 980 unfolds, the volume of the airbag 910 may increase, and amplify the expansion area created by cutting the one or more tethers 961. Accordingly, the addition of tear seams 980, in connection with cutting one or more tethers 961, may further increase the function angle between the airbag 910 and the occupant seating position from a normal function angle $F_{i1}$ to an expanded function angle $F_{i2}$.

Figure 10A:
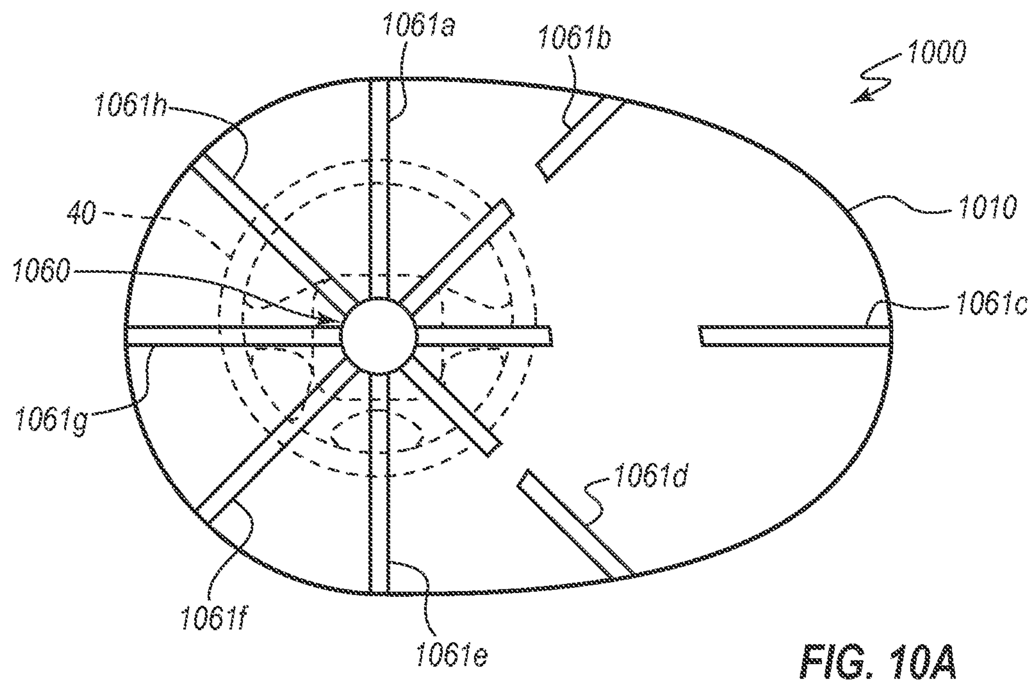
FIG. 10A is a forward view of an inflatable airbag system, according to one embodiment, showing the airbag in a deployed configuration with the steering wheel turned to 0 degrees.

FIG. 10A is a frontal view of an inflatable airbag system 1000 that is installed in a steering wheel 40 of a vehicle. The inflatable airbag system 1000 is depicted in a deployed configuration with the steering wheel 40 turned to 0 degrees. A top of the steering wheel 40 is positioned in a normal state at the top of the steering wheel 40, such that a steering system of the vehicle is directing the vehicle straight forward relative to the vehicle.

The inflatable airbag system 1000 includes an airbag 1010 and a positioning member 1060, which comprises a plurality of tethers 1061*a*, 1061*b*, 1061*c*, 1061*d*, 1061*e*, 1061*f*, 1061*g*, 1061*h* (collectively 1061) and positioning member adjustment mechanisms such as a tether cutter. A control unit (such as shown in FIG. 1) may include or be coupled to impact angle detection sensors and/or steering wheel angle sensors. In response to an oblique collision event, the impact angle detection sensors may detect the oblique collision event and signal the inflatable airbag system 1000 to alter conformation of the airbag 1010 to expand to a configuration according to the occupant's expected direction of travel from the normal seating position and also based on the current angle of the steering wheel 40.

For example, in FIG. 10A the steering wheel 40 is shown at a normal position with a rotational angle of 0 degrees (e.g., the top of the steering wheel is at 0 degrees). If signals from the control unit indicate an inboard oblique collision, conformation of the airbag 1010 to a second configuration, as shown, may be desired to provide inboard oblique collision protection for an occupant. The second configuration may include increased expansion of a portion of the airbag 1010 disposed more inboard, such that the airbag 1010 expands more in an inboard direction to widen an inboard function angle.

To achieve the second configuration, one or more of the plurality of tethers 1061 are adjusted. Specifically, in FIG. 10A, because the rotational angle of the steering wheel is 0 degrees, a second tether 1061*b*, a third tether 1061*c*, and a fourth tether 1061*d* are adjusted (e.g., cut) to allow greater expansion of the airbag 1010 in the inboard direction.

As noted, the positioning member 1060 may comprise a plurality of tethers 1061. As the steering wheel 40 rotates, each of the plurality of tethers 1061 may change location, for example relative to the instrument panel, the occupant, the vehicle, and the like. In other words, the position of each tether of the plurality of tethers 1061 rotates with the steering wheel 40. Accordingly, it may be necessary to adjust (i.e., cut, extend, and/or retract) different tethers 1061 depending on the rotational angle of the steering wheel 40.

Figure 10B:
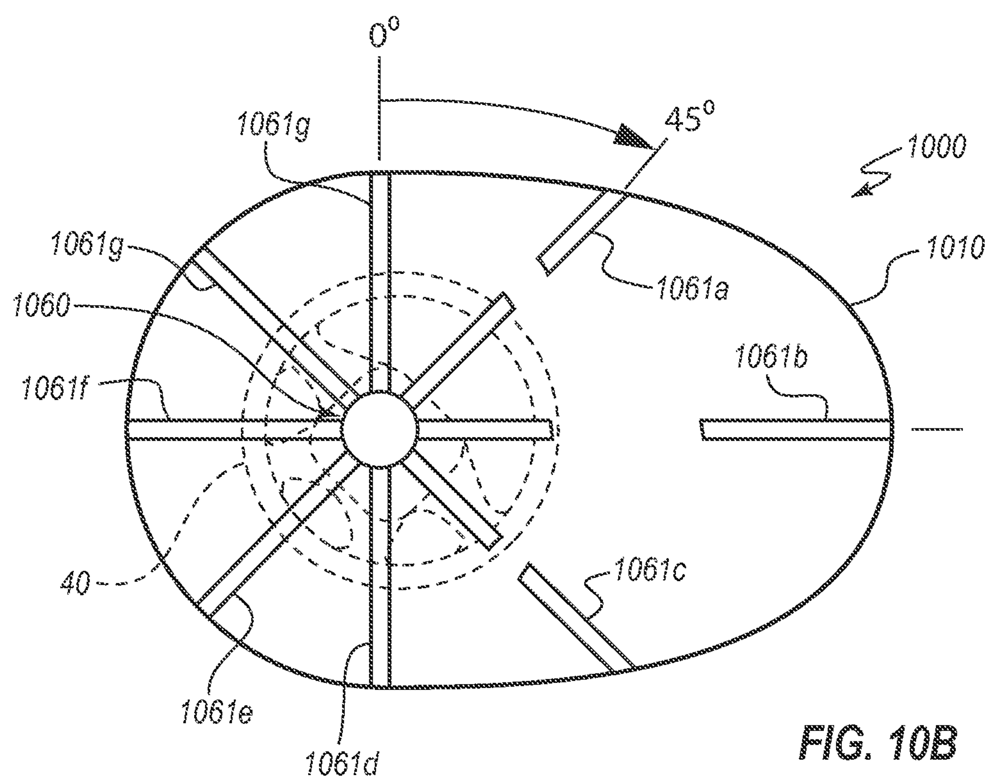
FIG. 10B is a forward view of the inflatable airbag system of FIG. 10A, showing the airbag in a deployed configuration with the steering wheel turned to 45 degrees.

FIG. 10B shows the steering wheel 40 at an angle of 45 degrees (e.g., with the top of the steering wheel 40 at 45 degrees, or rotated to an inboard direction or rotated toward a lateral side). Accordingly, to achieve a desired (and suitable) second configuration that provides inboard collision protection, the positioning member 1060 adjusts different tethers of the plurality of tethers 1061 to achieve the target configuration. Specifically, the positioning member 1060 adjusts (e.g., cuts) tethers 1061*a*, 1061*b*, and 1061*c* to achieve a second configuration that is similar to the second configuration of FIG. 10A.

Figure 10C:
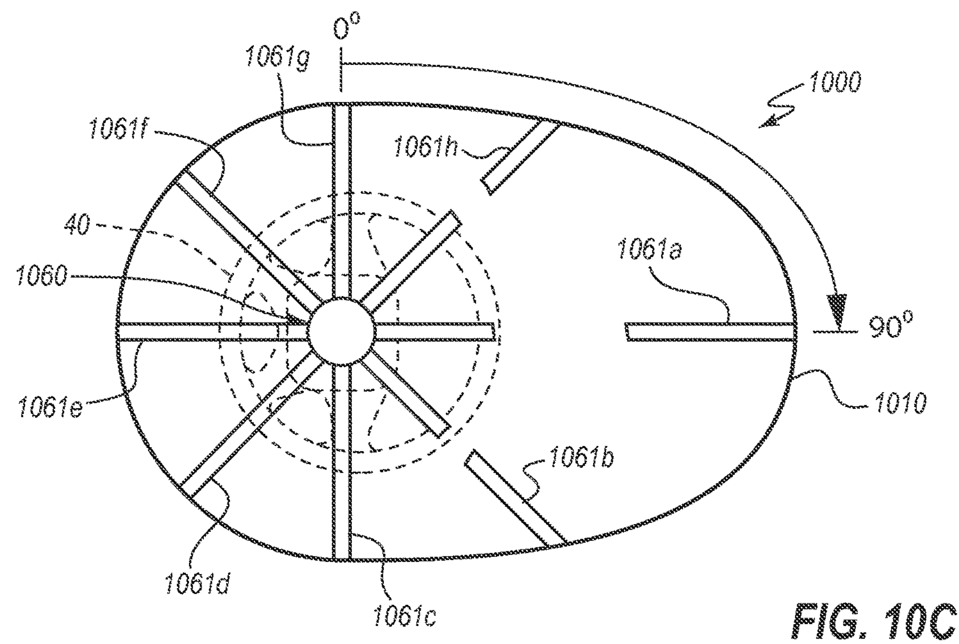
FIG. 10C is a forward view of the inflatable airbag system of FIG. 10A, showing the airbag in a deployed configuration with the steering wheel turned to 90 degrees.

FIG. 10C shows the steering wheel 40 at an angle of 90 degrees (e.g., with the top of the steering wheel 40 at 90 degrees, or rotated to an inboard direction or rotated to a lateral side). Accordingly, to achieve a desired (and suitable) second configuration that provides inboard collision protection, the positioning member 1060 adjusts different tethers of the plurality of tethers 1061 to achieve the target configuration. Specifically, the positioning member 1060 adjusts (e.g., cuts) tethers 1061*h*, 1061*a*, and 1061*b* to achieve a second configuration that is similar to the second configuration of FIG. 10A.

Figure 10D:
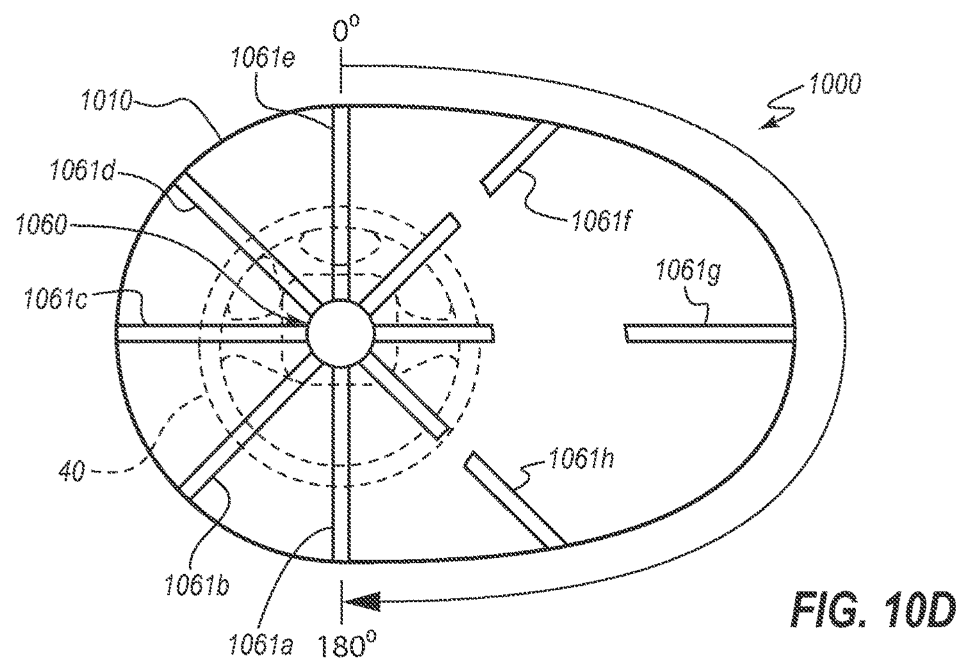
FIG. 10D is a forward view of the inflatable airbag system of FIG. 10A, showing the airbag in a deployed configuration with the steering wheel turned to 180 degrees.

FIG. 10D shows the steering wheel 40 at an angle of 180 degrees (e.g., with the top of the steering wheel 40 at 180 degrees, or rotated to be at the bottom). Accordingly, to achieve a desired (and suitable) second configuration that provides inboard collision protection, the positioning member 1060 adjusts different tethers of the plurality of tethers 1061 to achieve the target configuration. Specifically, the positioning member 1060 adjusts (e.g., cuts) tethers 1061*f*, 1061*g*, and 1061*h* to achieve a second configuration that is similar to the second configuration of FIG. 10A.

As can be appreciated, the positioning member 1060 can adjust any combination of tethers 1061 to account for any rotational angle of the steering wheel. The positioning member 1060 can adjust to achieve a desired second configuration based on any rotational angle of the steering wheel. In this manner, inboard oblique collision protection can be provided to a driver occupant of a vehicle.

A third configuration to provide outboard oblique collision protection can be achieved in a similar manner, by adjusting different sets of one or more tethers 1061, or otherwise adjusting the positioning member 1060 or causing the positioning member 1060 to adjust conformation of the airbag 1010 based on an impact angle and a rotational angle of the steering wheel.

In other embodiments the inflatable airbag system may comprise multiple positioning members and/or multiple positioning member adjustment mechanisms. The positioning member adjustment mechanism may adjust the location, rotation, orientation, position, or any combination thereof in order to approximate a desired second configuration or target configuration.

In other embodiments, the positioning member may comprise a plurality of individual tethers or a plurality of pairs of tethers attached to the interior of the airbag. The positioning member adjustment mechanism(s) may adjust (i.e., cut, extend, rotate, detach, deform, and/or retract) the tethers. The positioning member adjustment mechanism(s) may, in some embodiments, adjust the plurality of tethers each individually, in groups of two or more tethers, or as a whole. The description of the positioning member and the positioning member adjustment mechanism is meant to be illustrative and not limiting in scope. It may be understood that the positioning member adjustment mechanism may adjust/alter the positioning member in any way that is necessary and/or convenient in order to achieve a target configuration, based on detection of an oblique collision and based on a rotational angle of the steering wheel.

The foregoing description includes reference to an inboard direction and an outboard direction. In certain instances, usage of the inboard direction appears to be a direction to the right and usage of the outboard direction appears to be a direction to the left, such that the steering wheel (and therefore the driver) is on the left side of the vehicle. However, as can be appreciated, the application is not intended to be limited to vehicles having a steering wheel on a left side. The foregoing description and the technology described therein can also operate in vehicles for which a steering wheel is disposed on a right side of the automobile, such that the inboard direction is to the left and the outboard direction is to the right.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. An inflatable airbag system that is configured to be mounted to a steering wheel of a vehicle, the inflatable airbag system comprising:

an airbag cushion that is deployed in response to a collision event; and a positioning member disposed within the airbag cushion and configured to cause the airbag cushion to deploy in a first configuration if the collision event is a frontal collision event and to cause the airbag cushion to deploy in a second configuration if the collision event is an oblique collision event, wherein the second configuration caused by the positioning member is based on an angle of rotation of the steering wheel; and wherein the positioning member comprises a plurality of tethers, and the positioning member comprises a positioning member adjustment mechanism configured to, when activated, lengthen at least one of the plurality of tethers and shorten at least another of the plurality of tethers.

2. The inflatable airbag system of claim 1, further comprising:

one or more impact angle detection sensors to detect forces of an impact of the collision event and provide indication of a type of impact to the positioning member; and one or more steering wheel angle sensors to detect the angle of rotation of the steering wheel and provide the angle of rotation of the steering wheel to the positioning member.

3. The inflatable airbag system of claim 1, wherein a portion of the airbag cushion is configured to be disposed at a first position in the first configuration and a second position in the second configuration based on the positioning member.

4. The inflatable airbag system of claim 1, wherein at least one of the plurality of tethers is in an uncoupled state when the airbag cushion is in the second configuration and a coupled state when the airbag cushion is in the first configuration.

5. The inflatable airbag system of claim 1, wherein the positioning member adjustment mechanism comprises a tether cutter that, when activated, cuts at least one of the plurality of tethers to allow a portion of the airbag to conform to the second position.

6. The inflatable airbag system of claim 1, wherein the positioning member adjustment mechanism is configured to receive input indicating an angle of rotation of the steering wheel and input indicating a collision type and to adjust the positioning member, based on the angle of rotation of the steering wheel and the collision type, to cause the airbag cushion to deploy in the first configuration if the collision event is a frontal collision event and to cause the airbag cushion to deploy in the second configuration if the collision event is an oblique collision event.

7. The inflatable airbag system of claim 6, wherein the positioning member adjustment mechanism is activated if the collision event is an oblique collision event.

8. The inflatable airbag system of claim 6, further comprising:

one or more impact angle detection sensors to detect forces of an impact of the collision event and provide indication of a type of impact to the positioning member adjustment mechanism; and one or more steering wheel angle sensors to detect the angle of rotation of the steering wheel and provide the angle of rotation of the steering wheel to the positioning member adjustment mechanism.

9. The inflatable airbag system of claim 6, further comprising:

one or more impact angle detection sensors to detect forces of an impact of the collision event; and a control unit to receive sensor data from the one or more impact angle detection sensors and to provide input to the positioning member adjustment mechanism as to the type of the collision.

10. The inflatable airbag system of claim 9, further comprising:

one or more steering wheel angle sensors to detect the angle of rotation of the steering wheel, wherein the control unit receives sensor data from the one or more steering wheel angle sensors and provides input to the positioning member adjustment mechanism as to the angle of rotation of the steering wheel.

11. An inflatable airbag system that is configured to be mounted to a steering wheel of a vehicle, the inflatable airbag system comprising:

a housing to be mounted in a steering wheel of a vehicle;

an inflator;

an airbag cushion that receives inflation gas from the inflator to expand and deploy from the housing to provide occupant crash protection during a collision event;

one or more impact angle detection sensors to detect forces of an impact of the collision event of the vehicle and provide one of an impact ratio and an impact angle;

one or more steering wheel angle sensors to detect a rotational angle of the steering wheel of the vehicle; and a positioning member to receive one of the impact ratio and the impact angle and to receive the rotational angle of the steering wheel and to cause the airbag cushion to deploy in a first configuration if the one of the impact ratio and the impact angle is below a threshold and cause the airbag cushion to deploy in a second configuration if the one of the impact ratio and the impact angle is above the threshold, wherein the second configuration is determined based on the rotational angle of the steering wheel;

wherein the positioning member comprises a plurality of tethers; and wherein the positioning member is configured to, when activated, lengthen at least one of the plurality of tethers and shorten at least another of the plurality of tethers.

12. The inflatable airbag system of claim 11, further comprising a control unit to receive the sensor data from the one or more impact angle detection sensors and the one or more steering wheel angle sensors and to relay the rotational angle of the steering wheel and the one of the impact ratio and the impact angle to the positioning member.

13. The inflatable airbag system of claim 11, wherein the control unit determines the impact angle and the rotational angle of the steering wheel based on the sensor data from the one or more impact angle detection sensors and the one or more steering wheel angle sensors.

14. The inflatable airbag system of claim 11, wherein the positioning member comprises a plurality of tethers coupled to internal surfaces of the airbag cushion that define an inflatable chamber of the airbag cushion that receives the inflation gas from the inflator, wherein one or more tethers of the plurality of tethers are adjusted to cause the airbag cushion to deploy in the second configuration, wherein the one or more tethers of the plurality of tethers are selected based on the rotational angle of the steering wheel, and wherein adjusting the one or more tethers changes a shape of the airbag cushion when the inflatable chamber fills with inflation gas to expand the airbag cushion to an expanded state.

15. The inflatable airbag system of claim 11, wherein the one of the impact angle and the impact ratio being below the threshold indicates a frontal collision and the one of the impact angle and the impact ratio being above the threshold indicates an oblique collision.

16. The inflatable airbag system of claim 11, wherein the positioning member comprises a positioning member adjustment mechanism to receive the rotational angle of the steering wheel and the one of the impact angle and the impact ratio and to adjust the positioning member, based on the rotational angle of the steering wheel and the one of the impact angle and the impact ratio, to cause the airbag cushion to deploy in the first configuration or the second configuration.

17. The inflatable airbag system of claim 16, wherein the positioning member adjustment mechanism comprises one or more of a tether cutter, a motor, and a pyrotechnic.

18. An inflatable airbag system that is configured to be mounted to a steering wheel of a vehicle, the inflatable airbag system comprising:

an airbag cushion that is deployed in response to a collision event;

a positioning member disposed within the airbag cushion and configured to cause the airbag cushion to deploy in a first configuration if the collision event is a frontal collision event and to cause the airbag cushion to deploy in a second configuration if the collision event is an oblique collision event, wherein the positioning member comprises a plurality of tethers;

a positioning member adjustment mechanism that, when activated, adjusts at least one of the plurality of tethers of the positioning member; and a tear seam disposed in a panel of the airbag cushion at a portion of the airbag cushion, the tear seam configured to burst in response to adjusting of the at least one of the plurality of tethers to allow the portion of the airbag cushion to conform to the second configuration, wherein the second configuration caused by the positioning member is based on an angle of rotation of the steering wheel.

19. The inflatable airbag system of claim 18, wherein the positioning member adjustment mechanism comprises one or more of a tether cutter, a motor, and a pyrotechnic.

20. The inflatable airbag system of claim 18, wherein the positioning member is configured to receive input indicating an angle of rotation of the steering wheel and input indicating a collision type and to adjust the positioning member, based on the angle of rotation of the steering wheel and the collision type, to cause the airbag cushion to deploy in the first configuration if the collision event is a frontal collision event and to cause the airbag cushion to deploy in the second configuration if the collision event is an oblique collision event.

* * * * *